Patented Aug. 26, 1930

1,773,787

UNITED STATES PATENT OFFICE

CHARLES G. QUIGLEY, OF GARFIELD, UTAH

ART OF CONCENTRATION OF ORES

No Drawing.     Application filed August 8, 1928.  Serial No. 298,399.

This invention relates to the concentration of ores, minerals and the like by the froth flotation method, and particularly to a process of concentration involving the use of novel frothing agents of certain composition. Such frothing agents themselves and the general methods of making the same are described but not claimed herein, and are described more particularly and claimed in a separate application Serial No. 298,400 filed by me on August 8, 1928, and allowed June 13, 1930.

The principal object of the invention is to enable such concentrating operations to be conducted in a more economical manner by the use of these novel frothing agents.

It has been found, according to the present invention, that metallic salts of the so-called organic sulphuric acids are excellent frothers, and when used in conjunction with any other reagents that may be necessary, give a good froth, producing a clean concentrate, and, furthermore, that they do not interfere in any way with the selective properties of certain well known reagents used to effect differential or selective flotation.

The salts of organic sulphuric acids above referred to have the following general formula: $M(RSO_4)_n$ in which R is a monovalent organic radical and M a metal with a valence of $n$. R may also be a polyvalent organic radical, and in this case the above formula is modified according to the valence thereof.

The structural formula of these compounds in which R is a monovalent organic radical, and M a monovalent metal, may be written:

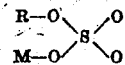

These compounds may in general be considered as compounds of sulphuric acid, in which one of the hydrogen atoms is replaced by an organic radical and the other by a metal. Such a compound may be defined as a mixed sulphate of an organic radical and a metal, and may be considered as a metallic salt of an organic sulphuric acid.

These compounds may in general be prepared by first treating an organic compound containing the desired radical with sulphuric acid of suitable concentration; the product of this reaction is an organic sulphuric acid (or organic acid sulphate) and may be used as a frothing agent in this form, but if it is desired to prepare a metallic salt thereof for use in accordance with the present invention, the resulting mixture, after cooling, may be added slowly to an aqueous solution or suspension of a suitable salt of the desired metal. The desired product, which is a mixed sulphate of a metal and the organic radical, may be separated by any suitable method, for example as hereinafter described.

The frothing agents of the above general composition may be used in substantially the same manner as other frothing agents for the purpose of effecting the desired concentration of the ore or other material and such agents may be employed in conjunction with any other desired reagents and in any desired proportions. The process consists in general in adding to a suspension or pulp of the ore to be treated and water, the desired proportion of frothing agent and any other desired flotation or conditioning reagents, subjecting the pulp to suitable agitation and removing therefrom the froth which is formed and which rises to the top of the pulp.

The following may be given as a specific example of one method of forming a frothing reagent of my invention. I may prepare calcium amyl sulphate by treating amyl alcohol with the theoretical quantity of ordinary concentrated sulphuric acid, cooling the resulting mixture, and pouring it slowly into a suspension of calcium carbonate in a small amount of water, such suspension preferably containing a sufficient excess of calcium carbonate to neutralize any free acid in said mixture. I do not wish to be limited to any exact proportions of reagents, but may use, for example, approximately 110 cc. of amyl alcohol (of a purity of 95% or more), approximately 53 cc. of concentrated sulphuric acid (containing about 95% $H_2SO_4$) and about 65 grams of calcium carbonate.

When the mixture obtained by addition of the amyl sulphuric acid to the calcium carbonate suspension becomes substantially neutral, said mixture is filtered. The filtrate contains calcium amyl sulphate in solution, from which it can be recovered if desired by evaporating off the water. Other salts of calcium, such as calcium acetate or calcium hypochlorite, may if desired be used in place of the carbonate.

Other compounds of the class above described, which may be used as frothing agents, include sodium amyl sulphate, as well as the mixed sulphates of either calcium or sodium and other alkyl radicals. Such other compounds may be prepared by methods similar to that above described, such methods being described in greater detail in my other application above referred to. In forming the compounds containing other alkyl radicals, the corresponding alcohols may be used in place of amyl alcohol. Salts of other metals, such as potassium, may also be used instead of sodium and calcium. Furthermore, other salts of these metals, such as the acetates, hypochlorites, or in general salts of other relatively weak acids, may be used in place of the carbonates in the preparation of the compounds.

The compounds may also be prepared from olefines instead of alcohols, a particular example of such a compound being obtained by treating cyclohexene, a cyclic mono-olefine, with the theoretical amount of an 81% solution of sulphuric acid and, when the reaction is apparently complete, pouring the resulting mixture into a suspension of calcium carbonate, substantially as described in the preparation of calcium amyl sulphate.

Compounds of this same general composition and suitable for use as frothing agents have also been prepared by treating a hydrocarbon or petroleum acid sludge containing organic sulphuric acids with a metallic salt in the presence of water or with a basic organic compound. A reagent of this sort may be prepared, for example, by pouring kerosene acid sludge slowly into an aqueous suspension of calcium carbonate and recovering the resulting salt or ester. By "acid sludge" I mean the sludge formed during the refining of kerosene or other hydrocarbon or petroleum product with sulphuric acid, such sludge being separated from the hydrocarbon, as by settling, and comprising organic sulphuric acids of different compositions, formed by reaction of the sulphuric acid with various unsaturated hydrocarbons contained in the hydrocarbon product. The frothing agents formed from such sludge consist of the mixed sulphates obtained from such unsaturated hydrocarbons and the particular metal whose salt was employed in the process of making same.

As above stated, any of the above described frothing agents may be used in substantially the same manner as frothing agents heretofore known, for effecting or promoting the separation of ores, minerals and the like.

Compounds of this same general composition and suitable for use as frothing agents have also been prepared by treating a hydrocarbon or petroleum acid sludge with a metallic salt in the presence of water or with a basic organic compound. A reagent of this sort may be prepared, for example, by pouring kerosene acid sludge slowly into an aqueous suspension of calcium carbonate and recovering the resulting salt or ester. By "acid sludge" I mean the sludge formed during the refining of kerosene or other hydrocarbon or petroleum product with sulphuric acid, such sludge being separated from the hydrocarbon, as by settling, and comprising organic sulphuric acids of different compositions, formed by reaction of the sulphuric acid with various unsaturated hydrocarbons contained in the hydrocarbon product. The frothing agents formed from such sludge consist of the mixed sulphates of such unsaturated hydrocarbon radicals and the particular metal whose salt was employed in the process of making same.

As examples of compounds containing a basic organic compound in combination with the organic sulphuric acid, instead of a metal, and suitable for use as frothing agents, I may mention pyridine amyl sulphate or mixed sulphates of pyridine and other alkyl radicals and also corresponding sulphates containing aniline instead of pyridine, and as above stated the method of preparing these compounds is substantially the same as that used in preparing the metal salts.

As above stated, any of the above described frothing agents may be used in substantially the same manner as frothing agents heretofore known, for effecting or promoting the separation of ores, minerals and the like.

As a specific example of carrying out the flotation operation according to this invention, the following procedure may be used: Utah Copper Company ore, which is ground in the plant with water and lime, is thickened and enough of the thickened pulp is added to the flotation machine to give 500 grams of dry ore. 250 mg. of lime is then added and the mixture is agitated for two minutes. 62.5 mg. of crude sodium cyanide is added and agitated for two minutes. One drop of alcohol treated with phosphorus pentasulphide and 70 mg. of calcium amyl sulphate are added and agitated one minute and then the mixture is diluted with water and the froth removed for seven minutes. The following are the averages of four tests using the above procedure:

|  | Cu | Fe | Ins. |  |
|---|---|---|---|---|
|  | Per cent | Per cent | Per cent |  |
| Heading | .919 | 2.18 |  |  |
| Rougher tailing | .072 | 1.37 |  |  |
| Rougher concentrate | 22.062 | 19.95 | 26.15 |  |
| Indicated extraction of copper (%) |  |  |  | 92.47 |
| Ratio of concentration |  |  |  | 25.96 |

The term "ratio of concentration" used in the above table is defined as the ratio of the weight of the feed in a given operation to the weight of the concentrate obtained from it.

The specific process above described is given only by way of example and many modifications may be made therein without departing from my invention. For example, the proportion of the above described frothing agents may be varied between wide limits, depending upon the character of the ore being treated and the degree of frothing required. Furthermore, such frothing agents may be employed in conjunction with any other flotation agents or chemical conditioning agents instead of those given in the above example, and while the above test was carrried out in an alkaline pulp, it will be understood that the invention is not limited in this respect and that the frothing agents of my invention may, if desired, be used in neutral or acid pulp.

I claim:

1. The method of effecting the concentration of minerals and the like which comprises adding to a mineral pulp a frothing agent comprising a compound of sulphuric acid in which one hydrogen atom is replaced by a metal and the other by an organic radical, and subjecting the resulting mixture to a froth flotation operation.

2. The method of effecting the concentration of minerals and the like which comprises adding to a mineral pulp a frothing agent comprising a compound of sulphuric acid in which one hydrogen atom is replaced by a metal and the other by an alkyl radical, and subjecting the resulting mixture to a froth flotation operation.

3. The method of effecting the concentration of minerals and the like which comprises adding to a mineral pulp a frothing agent consisting of a compound of sulphuric acid in which one hydrogen atom is replaced by an alkali forming metal and the other by an organic radical, and subjecting the resulting mixture to a froth flotation operation.

4. The method of effecting the concentration of minerals and the like which comprises adding to a mineral pulp a frothing agent consisting of a compound of sulphuric acid in which one hydrogen atom is replaced by an alkali forming metal and the other by an alkyl radical, and subjecting the resulting mixture to a froth flotation operation.

5. The method of effecting the concentration of minerals and the like which comprises adding to a mineral pulp a frothing agent comprising an organic calcium sulphate, and subjecting the resulting mixture to a froth flotation operation.

6. The method of effecting the concentration of minerals and the like which comprises adding to a mineral pulp a frothing agent comprising calcium alkyl sulphate, and subjecting the resulting mixture to a froth flotation operation.

7. The method of effecting the concentration of minerals and the like which comprises adding to a mineral pulp a frothing agent comprising calcium amyl sulphate and subjecting the mixture to a froth flotation operation.

In testimony whereof I have hereunto subscribed my name this 19th day of July, 1928.

CHARLES G. QUIGLEY.